J. P. ZIMMERMAN.
Car-Starter.

No. 196,282. Patented Oct. 16, 1877.

WITNESSES
Chas. J. Gooch
Le Blond Burdett

INVENTOR
John P. Zimmerman
By Knight Bros. Attorneys

N. PETERS, PHOTO-LITHOGRAPHER, WASHINGTON, D. C.

UNITED STATES PATENT OFFICE.

JOHN P. ZIMMERMAN, OF BELLEFONTE, PENNSYLVANIA, ASSIGNOR OF ONE-HALF HIS RIGHT TO HENRY W. FOUTZ, OF SAME PLACE.

IMPROVEMENT IN CAR-STARTERS.

Specification forming part of Letters Patent No. 196,282, dated October 16, 1877; application filed April 11, 1877.

*To all whom it may concern:*

Be it known that I, JOHN P. ZIMMERMAN, of Bellefonte, in the county of Centre and State of Pennsylvania, have invented certain new and useful Improvements in Car-Starters, of which the following is a specification:

My improvement consists, first, in combining, with an intermediate wheel on the axle, a lever which carries a reversible eccentric, and is operated by means of draft-chains extending to both ends of the car.

My improvement consists, secondly, in combining, with the lever, a rope or chain for placing the lever in operative position.

My improvement consists, thirdly, in combining, with the lever and its reversible eccentric, two ropes or chains for retracting the lever from either end of the car.

My improvement consists, fourthly, in means for reversing the operative position of the eccentric.

My improvement consists, fifthly, in mounting the eccentric and its reversing-pulley on a shaft having bearings in the lever.

Figure 1:
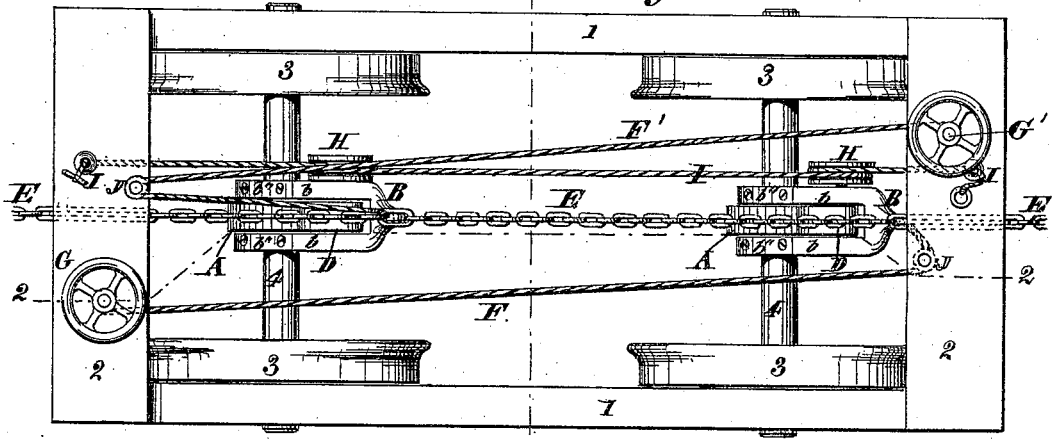
Figure 2:
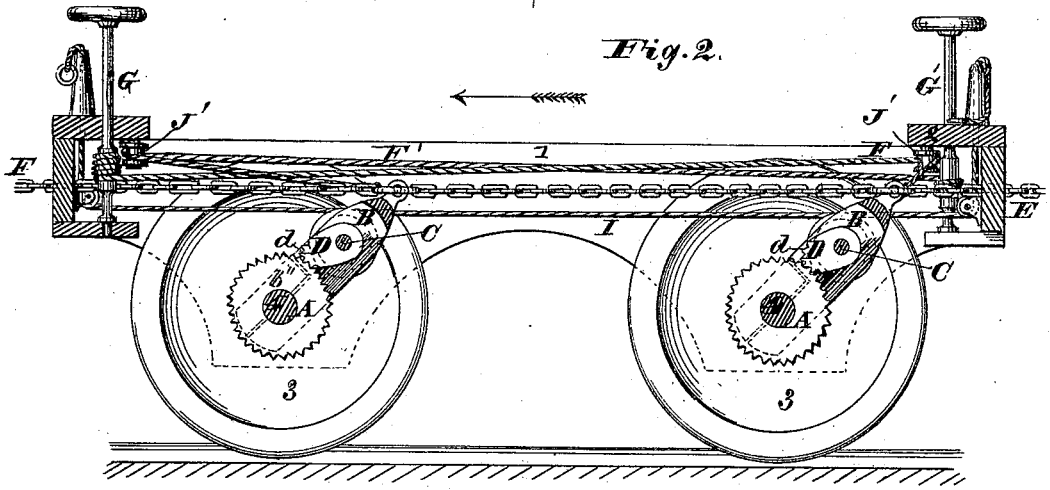
Figures 3, 4:
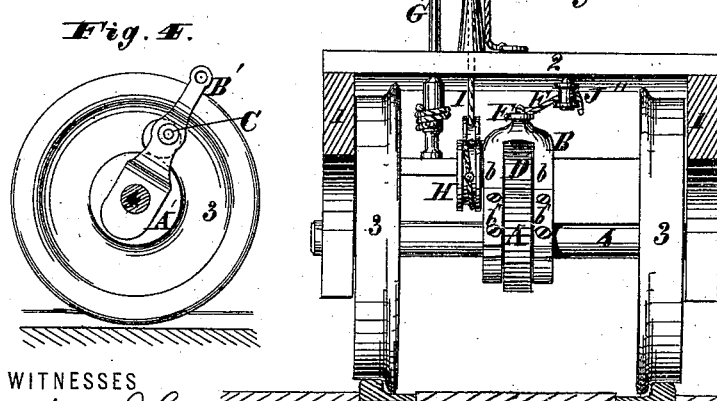
Figure 5:
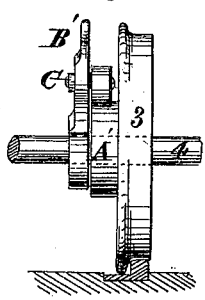

In the accompanying drawings, Figure 1 is a top view of my improved car-starter. Fig. 2 is a vertical longitudinal section of the same on the line 2 2, Fig. 1. Fig. 3 is a vertical transverse section on the line 3 3, Fig. 1. Fig. 4 is a side view, showing the application of the starter to the hub of a car-wheel. Fig. 5 is a front view of the same.

1 may represent the longitudinal bars, and 2 the transverse bars or platforms, of the car-bed; 3, the wheels, and 4 the axles, of a car. To the axles 4 I apply toothed or friction wheels A and levers B. The levers form bearings for a shaft, C, carrying an eccentric or cam, D, which may have a toothed portion, *d*. (See Fig. 2.) To the upper ends of the levers B is secured the draft-chain E, for attachment to the horses and retracting ropes or chains F F', connecting with hand or brake wheel shafts G G'. The outer ends of the shafts C carry sheaves or pulleys H, for reversing the position of the eccentrics D. The pulleys H are turned by a cord, or rope I, passing to the platforms at each end of the car.

The levers B are preferably constructed with arms *b*, having removable portions *b''*, to adapt them for application to the axles 4.

In the modification, Figs. 4 and 5, I show the wheel A as forming the hub A' of the car-wheel, and a lever, B', carrying an eccentric, adapted to bear upon said hub, to rotate the car-wheel.

The retracting rope or chain passes around a sheave, J, at the rear end, and the opposing rope or chain around a sheave, J', at the forward end of the car.

Whichever way the car is going, both ropes and brake-wheel shafts may be employed. The brake-wheel shaft at the front end is used for retracting, while the brake-wheel shaft at the rear end of the car is used for placing the lever in operative position.

Instead of the sheave J, I may use an eye, J'', (see Fig. 3;) and instead of a hand-wheel for the brake-shaft, a crank-handle may be employed.

The starter may be applied to the axles of wagons, carriages, or other vehicles besides car-axles.

The device operating on the intermediate wheel to turn it may be of any shape desired, as I do not limit myself to the precise oblong form or eccentric herein shown.

Operation: The car may be supposed to be going in the direction indicated by the arrow in Fig. 2, and the rope F slackened, to permit the eccentrics D to bear upon the wheels A. The chain E being pulled forward, the car-axles will be forced round, thus starting the rotation of the wheels. The hand-wheel shaft G is next rotated, to wind up the rope F, so as to return the levers to their first position, ready for another hitch. When the car reaches its destination the rope F is slackened, and the rope I pulled forward, which revolves the pulley H and reverses the position of the eccentrics D, and permits the levers B to pass the wheels A, so as to bring the eccentrics into operative position, to turn the wheels A in the opposite direction when the draft-chain is pulled at the opposite end of the car.

After the levers B are retracted, and before another hitch is taken, the position of the levers may be adjusted on the wheels A by turning the brake-wheel shaft G', so as to wind up the rope F'.

Having thus described my invention, the following is what I claim as new, and desire to secure by Letters Patent:

1. The lever B, carrying reversible eccentric D, and draft-chains E E, extending to both ends of the car, in combination with the axle 4, carrying intermediate wheel A, as and for the purpose set forth.

2. The combination, with the lever B, of the rope or chain F', sheave J', and rear hand-wheel shaft G', as and for the purpose set forth.

3. The combination, with the lever and reversible eccentric, of the ropes or chains F F', for retracting the lever, as and for the purpose set forth.

4. The combination of the reversing cord or chain I and pulley H with the eccentric D, as and for the purpose set forth.

5. The combination of the lever B, shaft C, eccentric, and pulley, arranged substantially as and for the purpose set forth.

JOHN P. ZIMMERMAN.

Witnesses:
R. C. CHEESMAN,
H. C. WEAVER.